United States Patent
Huras et al.

(10) Patent No.: US 7,188,124 B2
(45) Date of Patent: *Mar. 6, 2007

(54) METHOD, SYSTEM, COMPUTER PRODUCT FOR RECOVERING DROPPED DATABASE TABLE SPECIFYING ONE OR MORE TABLE SPACES, RECOVERING THE TABLE SPACE BEING RESTORED USING THE DROPPED TABLE HISTORY DATA STRUCTURE

(75) Inventors: Matthew Albert Huras, Ajax (CA); Dale M. McInnis, Aurora (CA); Effi Ofer, Thornhill (CA); Michael J. Winer, Markham (CA); Roger Luo Q. Zheng, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 350 days.

This patent is subject to a terminal disclaimer.

(21) Appl. No.: 10/718,009

(22) Filed: Nov. 19, 2003

(65) Prior Publication Data

US 2004/0103109 A1    May 27, 2004

Related U.S. Application Data

(63) Continuation of application No. 09/626,673, filed on Jul. 27, 2000, now Pat. No. 6,684,225.

(30) Foreign Application Priority Data

Jul. 29, 1999   (CA) ................................. 2279028

(51) Int. Cl.
*G06F 17/30* (2006.01)
*G06F 7/00* (2006.01)
*G06F 11/00* (2006.01)

(52) U.S. Cl. ......................... 707/202; 707/1; 707/102; 714/20

(58) Field of Classification Search ................ 707/1–5, 707/100–104.1, 200, 202; 717/22, 135; 714/20; 711/207, 221

See application file for complete search history.

(56) References Cited

U.S. PATENT DOCUMENTS

| 4,697,266 A |   | 9/1987 | Finley |
| 5,295,256 A | * | 3/1994 | Bapat ......................... 717/137 |

(Continued)

FOREIGN PATENT DOCUMENTS

| CA | 2249080 | * | 12/2001 | ..................... 17/30 |
| CA | 2419883 | * | 8/2004 | ..................... 17/30 |

(Continued)

OTHER PUBLICATIONS

Sun Hwan Kem et al. "A design and implementation of savepoints and partial rollbacks considering transaction isolation levels of SQL2", proceedings of the sixth international conference on database systems for advanced applications, Apr. 1999, 10 pages.*

(Continued)

*Primary Examiner*—Srirama Channavajjala
(74) *Attorney, Agent, or Firm*—Janaki K. Davda; Konrad Raynes & Victor LLP

(57) ABSTRACT

A technique for recovering a dropped table is provided. One or more table spaces are specified prior to one or more tables being dropped from the specified one or more table spaces. When a table is to be dropped from the one or more specified table spaces, a table identifier, a time stamp, and table definition attributes are stored for the dropped table in a data structure and the table is dropped. Upon receiving a request to restore a table space from the one or more specified table spaces, each of the one or more tables in the table space being restored is recovered using the data structure.

18 Claims, 1 Drawing Sheet

U.S. PATENT DOCUMENTS

| | | | |
|---|---|---|---|
| 5,553,279 A | 9/1996 | Goldring | |
| 5,555,404 A | 9/1996 | Torbjornsen et al. | |
| 5,596,710 A | 1/1997 | Voigt | |
| 5,625,815 A | 4/1997 | Maier et al. | |
| 5,646,871 A * | 7/1997 | Cadot | 702/1 |
| 5,802,514 A * | 9/1998 | Huber | 707/4 |
| 5,873,102 A * | 2/1999 | Bridge et al. | 707/204 |
| 5,890,167 A * | 3/1999 | Bridge et al. | 707/204 |
| 5,918,225 A * | 6/1999 | White et al. | 707/3 |
| 5,930,795 A * | 7/1999 | Chen et al. | 707/100 |
| 5,937,415 A * | 8/1999 | Sheffield et al. | 707/204 |
| 5,987,472 A * | 11/1999 | Serafin | 707/104.1 |
| 5,999,192 A * | 12/1999 | Selfridge et al. | 345/440 |
| 6,003,026 A * | 12/1999 | Bonzi | 707/4 |
| 6,073,129 A * | 6/2000 | Levine et al. | 707/4 |
| 6,112,024 A * | 8/2000 | Almond et al. | 717/122 |
| 6,115,704 A * | 9/2000 | Olson et al. | 707/3 |
| 6,122,640 A * | 9/2000 | Pereira | 707/103 R |
| 6,144,970 A * | 11/2000 | Bonner et al. | 707/206 |
| 6,157,928 A * | 12/2000 | Sprenger et al. | 707/103 R |
| 6,289,334 B1 * | 9/2001 | Reiner et al. | 707/3 |
| 6,606,617 B1 * | 8/2003 | Bonner et al. | 707/2 |
| 6,684,225 B1 * | 1/2004 | Huras et al. | 707/202 |
| 6,792,435 B1 * | 9/2004 | Ruddy | 707/202 |
| 7,028,022 B1 * | 4/2006 | Lightstone et al. | 707/2 |
| 7,031,987 B2 * | 4/2006 | Mukkamalla et al. | 707/204 |
| 2001/0051956 A1 * | 12/2001 | Bird | 707/203 |
| 2004/0103109 A1 * | 5/2004 | Huras et al. | 707/100 |
| 2005/0114365 A1 * | 5/2005 | Tucker | 707/100 |

FOREIGN PATENT DOCUMENTS

| | | | |
|---|---|---|---|
| CN | 1201950 | 12/1998 | |
| EP | 0690367 | * 1/1996 | 3/33 |
| EP | 1385100 | * 1/2004 | 17/30 |
| GB | 2279165 | * 12/1994 | 15/403 |
| JP | 61082227 | 4/1986 | |
| JP | 63211445 | 9/1988 | |
| JP | 3022152 | 1/1991 | |
| JP | 3116249 | 5/1991 | |
| JP | 4178846 | 6/1992 | |
| JP | 4188342 | 7/1992 | |
| JP | 5181729 | 7/1993 | |

OTHER PUBLICATIONS

"Oracle 7 recovery scenarios and equivalent Oracle 8 recovery manager techniq", Aug. 26, 1998, 9 pages.*

Georg Rehfeld, Installation of Oracle V 7.0.16.4.0 for the linux V 1.2.1, Jul. 21, 1998, 7 pages.*

Oracle Database Backup and Recovery advanced user's guide 10g release 1 (10.1) Part No. B10734-01, copyright 2003, 24 pages.*

"Recovery manager Oracle database 10g", feature overview:, Oracle database 10g Recovery manager feature overview, May 2004pp. 1-9.*

* cited by examiner

METHOD, SYSTEM, COMPUTER PRODUCT FOR RECOVERING DROPPED DATABASE TABLE SPECIFYING ONE OR MORE TABLE SPACES, RECOVERING THE TABLE SPACE BEING RESTORED USING THE DROPPED TABLE HISTORY DATA STRUCTURE

RELATED APPLICATIONS

This patent application claims priority from the commonly assigned Canadian Patent Application entitled "Dropped Database Table Recovery", having Canadian Patent Application Ser. No. 2,279,028, filed on Jul. 29, 1999 by Effi Offer, Roger Luo Q. Zheng, Matthew A. Huras, Michael J. Winer, and Dale M. McInnis and is a continuation of and claims the benefit of a U.S. patent application entitled "Dropped Database Table Recovery," having U.S. Pat. No. 6,684,225, U.S. application Ser. No. 09/626,673, filed on Jul. 27, 2000 by Effi Offer, Roger Luo Q. Zheng, Matthew A. Huras, Michael J. Winer, and Dale M. McInnis, each of which applications are incorporated herein by reference in their entirety.

FIELD OF THE INVENTION

The present invention is directed to an improvement in database systems and in particular to the recovery of tables dropped from databases.

BACKGROUND OF THE INVENTION

In relational databases, data is organized into tables. A collection of such tables in a database is referred to as a table space. Database users sometimes inadvertently delete, or drop, a table from a table space. Typically, a database management system (DBMS) does not permit undelete of the drop action: once the table drop is committed, the table's data is permanently deleted and cannot be brought back by way of such a command as an undelete of the drop statement. Instead, the data must be restored from a backup and then the data rolled forward by replaying stored transactions on the data, a potentially slow process.

In certain DBMS environments, such as DB2**, recovering a dropped table is made even more difficult by the fact that a table space restore followed by a roll forward of the table space to a point in time prior to the drop cannot be done. This restriction means that to roll forward to recover a dropped table, the entire database, and not only the effected table space, must be rolled forward. This restriction on the roll forward of the table space is due to the minimum recovery time property. A table space must be rolled forward to at least the minimum recovery time so that it is synchronized with the information in the system catalog tables. The minimum recovery time is updated when data definition language (DDL) statements are executed against a table space, or against tables in a table space.

The minimum recovery time will be later than the time at which the table was dropped. Because of this fact, it is a requirement in typical DBMS environments that the user must recover the entire database. This means that the entire database becomes unavailable to other users while the recovery and rollforward of the database is being carried out. It is typically slower to perform the recovery and restore on the entire database than a recovery and rollforward on the effected table space, only.

The only means in which a dropped table can be currently recovered in many relational databases, such as DB2, is through a database restore followed by a database roll forward to a point in time just prior to the table drop. As indicated above, such an approach will make the database as a whole unavailable to users. It may also be difficult to pinpoint when a table was dropped and therefore data will often be inaccurately retrieved due to uncertainties about when the table in question was dropped. In addition, the structure of the table may no longer be accurately known.

It is therefore desirable to have a DBMS in which tables that have been dropped may be recovered without the need to recover and roll forward the entire database and which permits the point at which the table was dropped to be determined with some accuracy, as well as to determine the structure of the table at the time of the drop.

SUMMARY OF THE INVENTION

A method, system, and program for recovering a dropped table are provided. One or more table spaces are specified prior to one or more tables being dropped from the specified one or more table spaces. When a table is to be dropped from the one or more specified table spaces, a table identifier, a time stamp, and table definition attributes are stored for the dropped table in a data structure and the table is dropped. Upon receiving a request to restore a table space from the one or more specified table spaces, each of the one or more tables in the table space being restored is recovered using the data structure.

According to another aspect of the preferred embodiments, there is provided a computer program product for use with a computer comprising a central processing unit and random access memory, said computer program product comprising a computer usable medium having computer readable code means embodied in said medium for managing a database, as described with respective to the above systems.

BRIEF DESCRIPTION OF THE DRAWINGS

Referring now to the drawings in which like reference numbers represents corresponding parts throughout.

Figure 1:
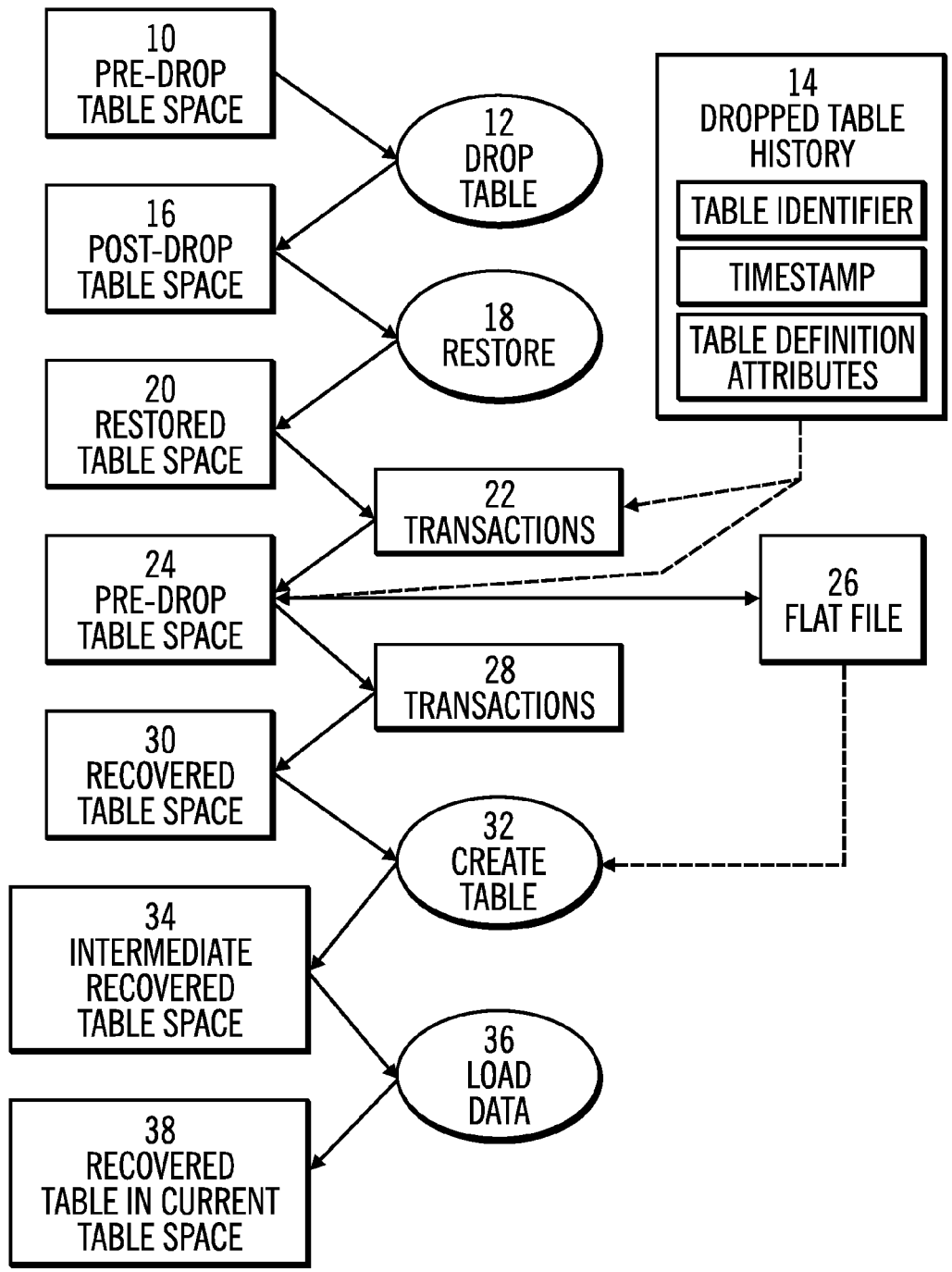
FIG. 1 is a block diagram showing the processing of the table space to recover a dropped table, in accordance with the system of the preferred embodiments.

In the drawing, the preferred embodiments of the invention are illustrated by way of example. It is to be expressly understood that the description and drawing are only for the purpose of illustration and as an aid to understanding, and are not intended as a definition of the limits of the invention.

DETAILED DESCRIPTION OF THE PREFERRED EMBODIMENTS

Referring to FIG. 1, there is a block diagram showing the processing of a table space to recover a dropped table. Pre-drop table space 10 represents a table space in a database which pre-drop table space 10 is in a state immediately preceding the point of commitment for drop table command 12. In the preferred embodiments, the database is a relational database which implements SQL, such as the DB2 DBMS. The system of the preferred embodiments permits a user to turn "on" a dropped table recovery flag. A sample SQL command to turn "on" the dropped table recovery flag for an example table space tsl is: alter table space tsl using dropped table recovery on If this flag is turned on for a table space, the system of the preferred embodiments will create an entry in a dropped table history 14 data structure, when a table (tsl, in the above example) is dropped from pre-drop table space 10. Dropped table history 14 records a dropped table ID, which is a unique identifier for the dropped table. Dropped table history 14 also provides a timestamp which reflects the time at which the dropped table was dropped from the table space, as well as information about the structure of the table (table definition attributes). The option to record an entry in the dropped table history 14 is table space specific. In the preferred embodiments, the flag may be queried in the "syscat.tablespaces" catalog table. There is a drop_recovery column which may be queried. The flag may be turned "off" and "on" by the user as required. When a table is dropped in the system of the preferred embodiments, the status of the flag is determined by the system and if the flag is "on", then information about the dropped table is stored in dropped table history 14.

In the system of the preferred embodiments, the dropped table history 14 may be accessed by the LIST HISTORY DROPPED TABLE command. This command returns the dropped table ID, timestamp of the drop, and information about the structure of the table. An example of the command for the database test_db is as follows:

list history dropped table all for test-db

After accessing the dropped table history 14 in this way, the user of the system of the preferred embodiments may then restore the table space. An example of such a command for table space tsl in database test_db is:

restore db test_db tablespace (tsl)

In FIG. 1, a post-drop table space 16 represents the state of the table space after the drop table command 12 has been committed. It is expected that a number of transactions (not shown) will have been processed and that the post-drop table space 16 may differ significantly from the state of the pre-drop table space 10.

FIG. 1 shows the execution of restore command 18. This results in a restored table space 20. The restored table space 20 must pre-date the pre-drop table space 10. The user then uses the rollforward command in the system of the preferred embodiments to replay stored transactions 22 against restored table space 20. The system of the preferred embodiment permits the user to stop the rollforward of restored table space 20 at the timestamp found in the dropped table history 14 for the table which was inadvertently dropped. The rollforward command of the preferred embodiment permits the user to specify that the rollforward is to stop at the drop point for a table with a given dropped table ID. In FIG. 1, transactions 22 are shown as being played against the restored table space 20, up to the point indicated by dropped table history 14. The result is the pre-drop table space 24. The state of the pre-drop table space 24 is intended to be materially equivalent to the state of pre-drop table space 10. The system has effectively permitted the recreation of the table space to the state of pre-drop table space 10, to permit the data from the dropped table to be extracted from the table space as it existed immediately prior to the drop table command 12 being committed in the system. Once the appropriate transactions have been replayed against restored table space 20 to create pre-drop table space 24, a copy of the dropped table is made in flat file 26.

To accomplish this the user specifies a file location and the table data as it existed prior to drop will be written to the file as a flat file with ASCII delimiters. An example rollforward command for the database test_db, table space tsl, dropped table ID "00000000000000b60000" is shown where the flat file representation of the table is to be stored in file location/temp/ffile.

rollforward db test_db to end of logs and stop tablespace (tsl) recover dropped table 00000000000000b60000 to temp/ffile With reference to FIG. 1, once the data from the dropped table in pre-drop table space 24 has been saved to flat file 26, further transactions 28 may be replayed on pre-drop table space 24 to result in recovered table space 30. The dropped table may be redefined in recovered table space 30 by create table command 32. The result is intermediate recovered table space 34. Load data command 36 repopulates the table created by create table command 32 from flat file 26 to create recovered table in current table space 38. In this way, the dropped table is recovered in the table space without the need to restore the entire database. It will be appreciated by those skilled in the art that although in FIG. 1 the various table spaces 10, 16, 20, 24, 30, 34 and 38 are shown as separate items, a typical implementation of the preferred embodiment uses the same table space for all items, although the state of the table space varies over time, as described above.

By replaying transactions on the table space only, rather than on the database as a whole, the database remains available for use by other users and the time to recover the dropped table is potentially shorter. The data from the dropped table is stored in flat file 26 to permit the data to be recovered into a table space which has different attributes than the table space from which the table was dropped. Dropped table history 14 includes dropped table characteristics which permit the table to be redefined in intermediate recovered table space 34 by create table command 32.

In SQL commands, the above procedure may be carried out using the following steps. An example of how to define the table into which the dropped table data will be copied is the following SQL command:

create table "test "."table1" ("col1" integer) in "tsl"

The table is then repopulated from flat file 25 using a command:

load from data of del insert into table1

As will be apparent to one skilled in the art, there are other variations on the above approach to recovering the dropped table, given the system of the preferred embodiment. In particular, the recovery of the dropped table may be accomplished by restoring the database as a whole into a different system than the first database. The table space can then be restored in the second system and the rollforward and recovery of the dropped table carried out "offline". This will permit the existing database to be used without making even the table space of the dropped table unavailable to users of the system. Another alternative to the steps described above is to make a copy of the current table space before carrying out the restore of the table space. Once flat file 26 is created, transactions 28 may be ignored and recovered table space 30 may be created by restoring the copy of the current table space, rather than by replaying transactions 28 on pre-drop table space 24. This alternative approach is advantageous where there are significant numbers of transactions in transactions 28.

As will also be apparent to those skilled in the art, flat file 26 may have other uses, and the data in flat file 26 may be exported to other applications or used in the database in other contexts than the repopulation of the dropped table.

Although preferred embodiments have been described here in detail, it will be appreciated by those skilled in the art, that variations may be made thereto, without departing from the spirit of the invention or the scope of the appended claims.

What is claimed is:

1. A method for recovering a dropped table, comprising:
    specifying one or more table spaces prior to one or more tables being dropped from the specified one or more table spaces, wherein specifying one or more table spaces comprises setting a dropped table recovery flag for each of the one or more table spaces in response to a request;
    in response to receiving a request to drop a table from one of the one or more specified table spaces,
        storing a unique table identifier, a time stamp reflecting the time of drop, and table definition attributes for the table in a dropped table history data structure; and
        dropping the table;
    in response to receiving a request to restore the table space that includes the dropped table, recovering the table space being restored using the dropped table history data structure, wherein the restored table space pre-dates the table space from which the table was dropped; and
    in response to receiving a rollforward command,
        rolling forward the table space containing the dropped table to a time reflected in the time stamp reflecting the time of the drop by replaying a set of stored transactions up to the time reflected in the time stamp; and
        copying data from the dropped table in the rolled forward selected table space to a storage data structure at a file location specified by a user.

2. The method of claim 1, wherein the table to be dropped from the one or more specified table spaces is a first table and further comprising:
    when a second table is to be dropped from a table space other than the one or more specified table spaces, dropping the second table without modifying the dropped table history data structure.

3. The method of claim 1, wherein the dropped table recovery flag is capable of being changed.

4. The method of claim 1, after restoring the table space, further comprising:
    accessing the table definition attributes for the dropped table, in the dropped table history data structure, to create a new table in the table space; and
    loading the data in the storage data structure into the new table.

5. The method of claim 4, wherein the storage data structure is a flat file.

6. The method of claim 1, wherein during the recovery of one or more tables in the table space to be restored, the database, excluding the table space to be restored, is accessible to users.

7. A system for recovering a dropped table, comprising:
    means for specifying one or more table spaces prior to any tables being dropped from the specified one or more table spaces, wherein specifying one or more table spaces comprises setting a dropped table recovery flag for each of the one or more table spaces in response to a request;
    in response to receiving a request to drop a table from one of the one or more specified table spaces,
        means for storing a unique table identifier, a time stamp reflecting the time of drop, and table definition attributes for the table in a dropped table history data structure; and
        means for dropping the table;
    means for, in response to receiving a request to restore the table space that includes the dropped table, recovering the table space being restored using the dropped table history data structure, wherein the restored table space pre-dates the table space from which the table was dropped; and
    in response to receiving a rollforward command,
        means for rolling forward the table space containing the dropped table to a time reflected in the time stamp reflecting the time of the drop by replaying a set of stored transactions up to the time reflected in the time stamp; and
        means for copying data from the dropped table in the rolled forward selected table space to a storage data structure at a file location specified by a user.

8. The system of claim 7, wherein the table to be dropped from the one or more specified table spaces is a first table and further comprising:
    when a second table is to be dropped from a table space other than the one or more specified table spaces, means for dropping the second table without modifying the dropped table history data structure.

9. The system of claim 7, wherein the dropped table recovery flag is capable of being changed.

10. The system of claim 7, after restoring the table space, further comprising:
    means for accessing the table definition attributes for the dropped table, in the dropped table history data structure, to create a new table in the table space; and
    means for loading the data in the storage data structure into the new table.

11. The system of claim 10, wherein the storage data structure is a flat file.

12. The system of claim 7, wherein during the recovery of one or more tables in the table space to be restored, the database, excluding the table space to be restored, is accessible to users.

13. A computer program product comprising a computer usable medium having computer readable code stored in said computer readable medium, said computer program product comprising:
    specifying one or more table spaces prior to any tables being dropped from the specified one or more table spaces, wherein specifying one or more table spaces comprises setting a dropped table recovery flag for each of the one or more table spaces in response to a request;
    in response to receiving a request to drop a table from one of the one or more specified table spaces,
        storing a unique table identifier, a time stamp reflecting the time of drop, and table definition attributes for the table in a dropped table history data structure; and
        dropping the table;
    in response to receiving a request to restore the table space that includes the dropped table, recovering the table space being restored using the dropped table history data structure, wherein the restored table space pre-dates the table space from which the table was dropped; and
    in response to receiving a rollforward command,
        rolling forward the table space containing the dropped table to a time reflected in the time stamp reflecting the time of the drop by replaying a set of stored transactions up to the time reflected in the time stamp; and copying data from the dropped table in the rolled forward selected table space to a storage data structure at a file location specified by a user.

14. The computer program product of claim 13, wherein the table to be dropped from the one or more specified table spaces is a first table and wherein the operations further comprise:

when a second table is to be dropped from a table space other than the one or more specified table spaces, dropping the second table without modifying the dropped table history data structure.

15. The computer program product of claim 13, wherein the dropped table recovery flag is capable of being changed.

16. The computer program product of claim 13, wherein after restoring the table space, the operations further comprise:

accessing the table definition attributes for the dropped table, in the dropped table history data structure, to create a new table in the table space; and loading the data in the storage data structure into the new table.

17. The computer program product of claim 16, wherein the storage data structure is a flat file.

18. The computer program product of claim 13, wherein during the recovery of one or more tables in the table space to be restored, the database, excluding the table space to be restored, is accessible to users.

* * * * *